United States Patent [19]

George

[11] Patent Number: 4,684,302

[45] Date of Patent: Aug. 4, 1987

[54] KEEPER FOR MACHINE TOOLS AND THE LIKE

[76] Inventor: Dennis L. George, 8566 SE. Roots Rd., Clackamas, Oreg. 97015

[21] Appl. No.: 909,384

[22] Filed: Sep. 19, 1986

[51] Int. Cl.$^4$ ............................................. B23C 5/26
[52] U.S. Cl. ..................................... 409/233; 279/97; 408/239 R
[58] Field of Search ..................... 409/233, 232, 234; 408/239 R, 238; 279/86, 89, 90, 91, 97, 103, 105, 93, 94

[56] References Cited

U.S. PATENT DOCUMENTS

| | | | |
|---|---|---|---|
| 701,792 | 6/1902 | Atkinson | 279/97 |
| 1,823,971 | 9/1931 | Erlandson | 279/97 |
| 2,667,687 | 2/1954 | Clarkson | 279/97 |
| 2,825,571 | 3/1958 | McIntosh | 409/233 X |

FOREIGN PATENT DOCUMENTS

| | | | |
|---|---|---|---|
| 1477376 | 1/1969 | Fed. Rep. of Germany | 279/86 |
| 688527 | 3/1953 | United Kingdom | 279/97 |
| 836167 | 6/1960 | United Kingdom | 409/233 |
| 846828 | 8/1960 | United Kingdom | 279/97 |
| 5446434 | 3/1977 | U.S.S.R. | 409/234 |

*Primary Examiner*—William R. Briggs
*Attorney, Agent, or Firm*—Henderson & Sturm

[57] ABSTRACT

The disclosure is of a spreadable keeper for use in the cooperative slots in a machine tool spindle and its associated shank or tang. In use, the slots are partly aligned crosswise of the spindle axis of rotation and the keeper is inserted in the slots and screw-expanded to force the tang or shank more tightly into the tapered bore of the spindle. The keeper comprises a base on which are mounted cooperative camming members operable by a screw to expand lengthwise of the spindle for exporting the tightening force.

5 Claims, 8 Drawing Figures

KEEPER FOR MACHINE TOOLS AND THE LIKE

BACKGROUND AND SUMMARY

As is known, a typical mill, for example, has a rotating spindle provided with a tapered, smooth bore for receiving a comparably tapered shank or tang of a tool such as a line bar or the like. In conventional construction, cooperative crosswise slots in the shank and spindle are provided, and these slots, although partly alined, are axially offset. In a vertical attitude, the bottom of the spindle shank is spaced below the top end of the shank slot. It is commonplace to manually force a wedge between the aforesaid slot portions for compelling the shank to move upwardly and thus more tightly into the spindle bore.

According to the present invention, a novel form of expandable keeper is provided, which is a relatively small, compact unit having screw-actuated cooperative cam members or ramps for exerting the tightening force. The unit is of simple design, preferably made of suitable steel parts that are few in number and so arranged as to be substantially mutually cooperative in keeping the unit assembled and thus preventing loss of its parts. More specifically, the unit comprises a base having at one end an upstanding anchor to which is pivoted a tongue having an undersurface in the form of a cam adapted to ride on a ramp formed on a block carried by the block for movement lengthwise thereof toward and away from the anchor, the movement being controlled by a screw which, when turned in one direction, draws the block toward the anchor and causes the tongue to ride upwardly. The block engages the bottom of the spindle slot and the tongue engages the top of the shank slot.

It is a feature of the invention that the size of the unit is such that it fits readily into the spindle and shank slots without projecting beyond the circumference of the spindle. The pivoting of the tongue is such as to embody a retaining function as respects the screw, eliminating the need to provide a bore in the anchor to which the tongue is pivoted. Further, the bottom of the tongue, in addition to being formed as a cam, has a groove that at least partly engages the screw loosely from above, thus further adding to the alinement of the screw and ramp block with the base. A stop is provided on the base to prevent escape of the block during loosening rotation of the screw.

The foregoing and other features and advantages of the invention will become apparent from the ensuing description of a preferred embodiment of the invention, taken in conjunction with the accompanying sheet of drawings.

DESCRIPTION OF A PREFERRED EMBODIMENT OF THE INVENTION

Figure 1:
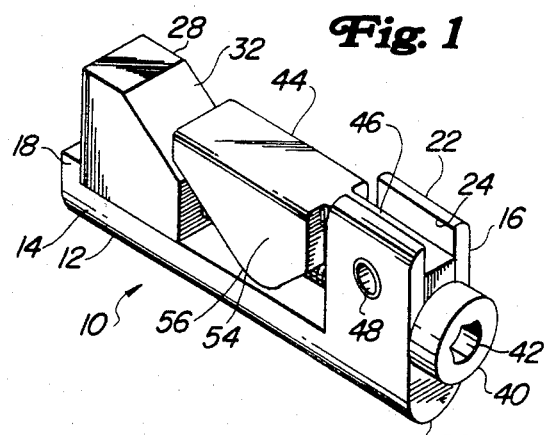
FIG. 1 is a perspective of the assembled unit.
Figure 6:
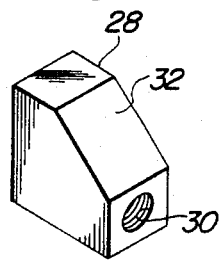
FIG. 6 is a perspective of the ramp block.
Figure 2:
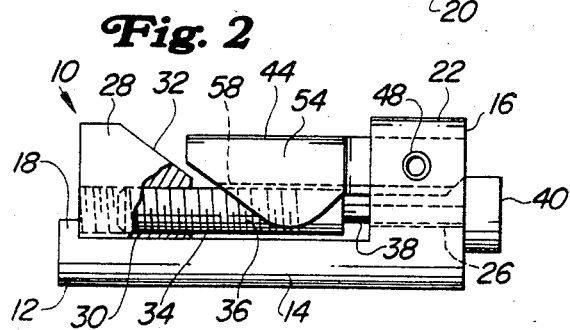
FIG. 2 is a side elevation of the unit, with parts broken away and shown in section.

The unit as a whole is designated by the numeral (10) and comprises an L-shaped member (12) having an elongated horizontal leg (14) and an upstanding leg (16). It is preferred that the member (12) be of onepiece steel construction. Reference to its disposition as being horizontal is for ease of description, because, in use, the unit may be otherwise oriented. The base (14), at its free end (opposite the end at which the leg (16) is disposed) has an integral abutment (18) for purposes to appear presently. The bottom of the base is rounded in semi-circular fashion as best seen at (20) in FIGS. 1 and 7, which corresponds to the shape of the bottom of a slot in a spindle, to be described later.

Figure 7:
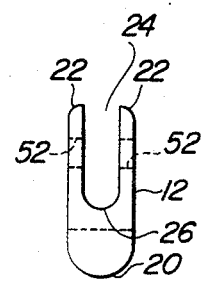
FIG. 7 is an end view of the base member.
Figure 3:
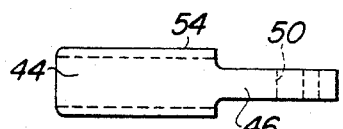
FIG. 3 is a top view of the tongue.
Figure 4:
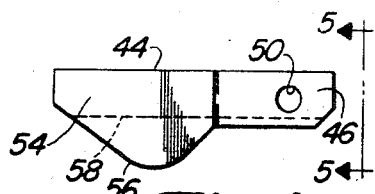
FIG. 4 is a side view of the tongue.
Figure 5:
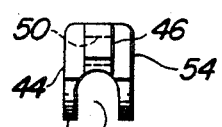
FIG. 5 is an end view of the tongue.

The leg (16) serves as an anchor and will be referred to as such in the description that follows. The anchor is bifurcated to provide spaced apart furcations (22) and a slot (24) that runs lengthwise as respects the base. As best seen in FIG. 7, the slot has a closed rounded bottom (26) and is open at its top.

Spaced lengthwise of the base from the anchor is a steel block (28), shown as being in its position of maximum distance from the anchor and against the stop (18), which confines the block against left-ward escape from the base. The block is provided with a horizontal tapped bore (30) and further has a ramp (32) facing toward the anchor and running uphill and away from the anchor. The block is movable lengthwise of the base by means of a screw (34) which has a threaded portion (36) threaded into the block bore and a reduced shank portion (38) which passes relatively loosely through the anchor slot at the bottom thereof and which has a head (40) abutting the outer face of the anchor bordering the bottom of the slot. The head is provided with a hexagonal socket (42) for receiving a suitable tool (not shown) for turning the screw to move the block selectively toward and away from the anchor.

A further part of the unit is a tongue (44) disposed in overlying relation to the screw and having a narrowed tail (46) loosely received in the slot between the furcations (22) of the anchor and pivoted to the anchor on a transverse axis by a pivot pin (48), the tail having an opening (50) for that purpose which is alined with cross openings (52) in the anchor. Because of this pivot, the tongue may move upwardly and downwardly, being biased downwardly by its own weight. The tongue extends forwardly in overlying relation to the screw as an integral enlarged body (54) having an undersurface or portion formed as a cam (56) which has a longitudinal groove (58) therein which at least partly embraces the screw (34) from above. This relationship to the screw aids in keeping the screw alined fore-and-aft or horizontally of the base, especially in addition to the location of the pivot pin (48) loosely above the shank portion (38) of the screw, observing that the ramp block bore and rounded bottom of the anchor slot are horizontally coaxial, which is also the axis of the screw. By this arrangement, boring of the anchor for the screw is avoided. Thus the screw is retained from above by the pin and weight of the tongue and is retained from side to side by the groove in the tongue. This avoids any requirement that a special slide be provided on the base for guiding the ramp block.

Figure 8:
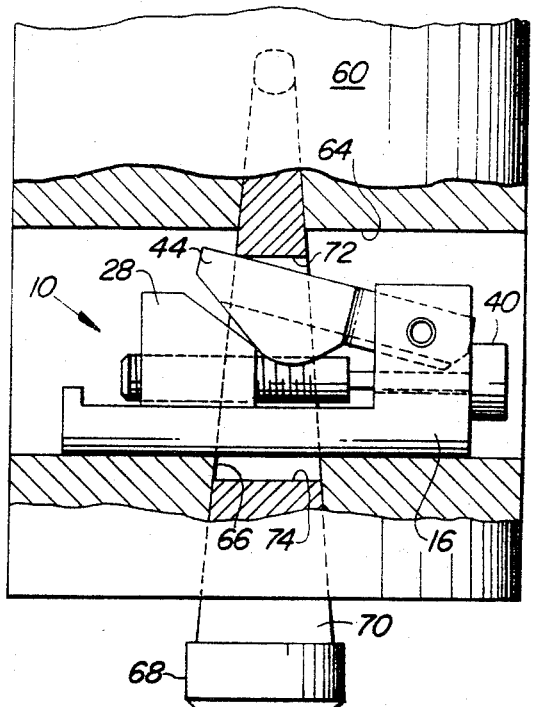
FIG. 8 is a fragmentary view, with parts broken away and shown in section and illustrating a typical use of the unit in securing a tool shank to a spindle.

FIG. 8 illustrates a representative use of the unit. Shown is a machine tool spindle (60) typically having a tapered bore (62) intersected by a cross slot defined by top and bottom surfaces (64) and (66), respectively. A tool part, such as a line bar (68) has a tapered shank (70) configured to tightly fit the spindle bore. The shank is formed with a cross slot defined by top and bottom edges (72) and (74), respectively. When initially assembled, by thrusting the line bar shank upwardly (in this case) into the spindle bore, a fairly tight fit is achieved but normally not enough to cause the spindle and line bar to rotate in unison under loads of any consequence. It is to be observed that the top and bottom of the shank slot are respectively below the edges or surfaces (64) and (66) of the spindle slot; i.e., the slots are slightly axially offset although transversely alined. The unit (10) is inserted crosswise of the assembly and thus through the alined portions of the slot. The bottom of the base rests on the bottom surface of the spindle slot and the tongue is in position to engage the top edge of the shank slot. The screw (34) of the unit is tightened to draw the ramp block toward the anchor and the ramp engages the bottom cam on the tongue, causing the tongue to ride up the ramp and thus away from the base of the unit, resulting of course in forcible engagement of the tongue with the top of the shank slot and consequent upward movement (albeit slight) of the shank relative to the spindle bore and assuring a tight fit capable of withstanding substantial torque loads. Since the reduced portion of the screw is relatively loosely confined to the anchor slot, initial movement of the ramp toward the tongue cam may be effected by simply sliding the block in that direction, by either pulling on the screw head or pushing on the ramp block.

It will be seen from the foregoing that a novel, compact unit has been provided, comprising very few parts, the movable ones of which are mutually supportive of each other both functionally and in the sense of one retaining another, thus eliminating excessive boring and other machining operations. The unit may be made in various sizes to fit various conditions. Further changes and modifications may be made in the preferred embodiment illustrated and described, all without departure from the spirit and scope of the invention.

I claim:

1. A machine tool keeper comprising an L-shaped member having an elongated horizontal leg serving as a base and an integral upstanding leg providing an anchor at one end of the base, said anchor being bifurcated to provide a slot running lengthwise as respects the base and having a closed bottom adjacent to the base and an open top at the top of the anchor, a block carried by the base in horizontally spaced relation to the anchor and movable lengthwise of the base, the block having a tapped bore horizontally coaxial with the bottom of the slot in the anchor, said block further having a ramp facing toward the anchor and running uphill from the base and away from the anchor, a tongue having a tail received in the slot and pivoted to the anchor on a transverse horizontal axis above the bottom of the slot and further having a body portion overlying and adapted to ride on the ramp during movement of the block, and a horizontal screw passing through the slot, below the tongue and tongue pivot and threaded into the block bore and having a head abutting the anchor from the side thereof opposite to the extent of the tongue, said screw being turnable to draw the block toward the anchor and thus to cause the tongue body to ride up the block ramp and away from the base.

2. The keeper of claim 1, including a stop at the end of the base opposite the anchor and engageable with the block to prevent the block from escaping horizontally from the base during turning of the screw in a direction to move the block away from the anchor.

3. The keeper of claim 1, in which the underside of the tongue body has a groove therein running lengthwise of the screw and at least partly relatively loosely embracing the screw from above.

4. The keeper of claim 1, in which the body has an undersurface shaped as a cam cooperative with the ramp on the block.

5. The keeper of claim 1, in which the tongue pivot is spaced above that portion of the screw that passes through the anchor slot, whereby that screw portion is loosely received in the anchor slot.

* * * * *